United States Patent
Kiefer et al.

(10) Patent No.: US 12,329,054 B2
(45) Date of Patent: Jun. 17, 2025

(54) METHOD OF SPREADING GRANULAR MATERIAL

(71) Applicant: Amazonen-Werke H. Dreyer GmbH & Co. KG, Hasbergen (DE)

(72) Inventors: Stefan Kiefer, Osnabrück (DE); Timo Klemann, Belm (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 955 days.

(21) Appl. No.: 17/206,589

(22) Filed: Mar. 19, 2021

(65) Prior Publication Data

US 2021/0289690 A1 Sep. 23, 2021

(30) Foreign Application Priority Data

Mar. 20, 2020 (EP) ..................... 20401020

(51) Int. Cl.
 A01C 17/00 (2006.01)
 A01C 15/00 (2006.01)
(52) U.S. Cl.
 CPC .......... *A01C 17/008* (2013.01); *A01C 15/005* (2013.01)
(58) Field of Classification Search
 CPC ............................ A01C 15/005; A01C 17/008
 USPC ......................................................... 239/665
 See application file for complete search history.

(56) References Cited

U.S. PATENT DOCUMENTS

| | | | | | |
|---|---|---|---|---|---|
| 4,526,236 A | * | 7/1985 | Jacobsen | ............... | A01B 69/024 |
| | | | | | 172/126 |
| 4,700,301 A | * | 10/1987 | Dyke | ................... | G05D 1/0244 |
| | | | | | 701/25 |
| 4,706,773 A | * | 11/1987 | Reinaud | ............... | A01B 69/001 |
| | | | | | 180/169 |
| 4,986,473 A | * | 1/1991 | Semple | ............... | A01M 7/0064 |
| | | | | | 239/109 |
| 5,279,068 A | * | 1/1994 | Rees | ................... | A01M 7/0057 |
| | | | | | 47/1.7 |
| 2015/0059626 A1 | * | 3/2015 | Conrad | ............... | A01M 9/0092 |
| | | | | | 111/120 |

FOREIGN PATENT DOCUMENTS

DE 44 13 739 A1 10/1995
DE 10 2017 210804 A1 12/2018

OTHER PUBLICATIONS

DE4413739 Google English Translation (Year: 1994).*
European Search Report mailed Aug. 20, 2020 in corresponding European Patent Application No. EP 20401020.1.

* cited by examiner

*Primary Examiner* — Chee-Chong Lee
(74) *Attorney, Agent, or Firm* — Mintz Levin Cohn Ferris Glovsky and Popeo, P.C.

(57) ABSTRACT

A method of spreading granular material by an agricultural distribution device includes the steps of: spreading granular material onto an agricultural land by a plurality of distribution elements arranged on a distribution linkage of the agricultural distribution device, and detecting plant rows on the agricultural land during the spreading of the granular material, wherein the granular material is spread in row areas of the agricultural land having plant rows by at least one distribution element with a first distribution pattern and is spread in row-free areas of the agricultural land not having plant rows by at least one distribution element with a second distribution pattern.

11 Claims, 2 Drawing Sheets

METHOD OF SPREADING GRANULAR MATERIAL

CROSS REFERENCE TO RELATED APPLICATION

Figure 1:
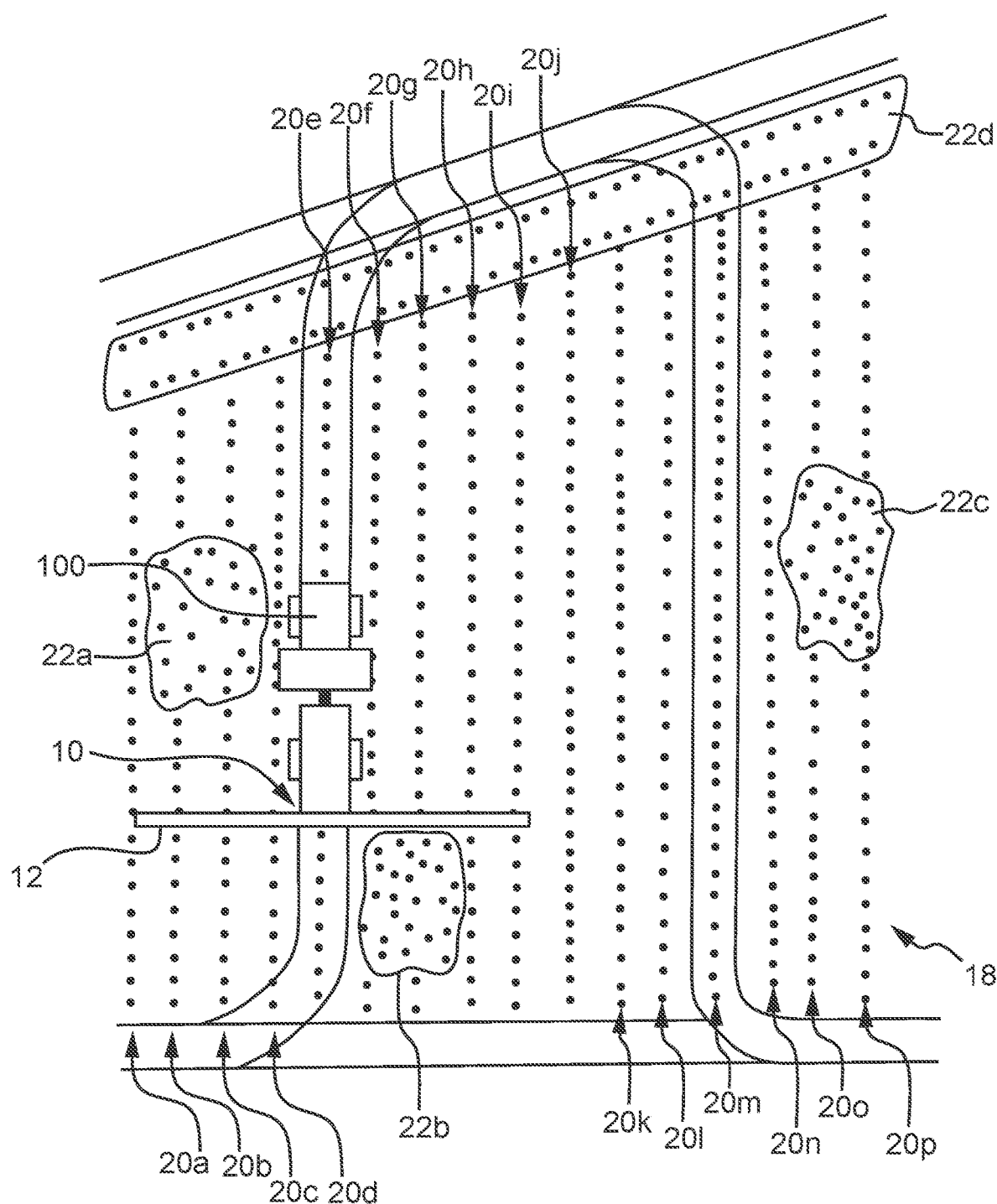

The present application claims under 35 U.S.C. § 119 (a) the benefit of European Patent Application No. 20401020.1, filed Mar. 20, 2020, the entire contents of which are incorporated by reference herein.

The invention relates to a method of spreading granular material and to an agricultural distribution device.

When spreading granular material, such as granular or powdered fertilizer, agricultural distribution devices, also referred to as pneumatic fertilizer spreaders, may be used, which comprise a plurality of distribution elements arranged on a distribution linkage, for example, distribution nozzles, baffle plates, guiding devices, deflectors and/or the like.

Since the seeding of a variety of agricultural crops occurs along seed rows, the growth phase results in corresponding rows of plants on the agricultural land.

From the state of the art, devices are already known for detecting wild plants which grow next to the crop plants on the agricultural land. Based on the wild plant detection, plant protection products can then be spread in a targeted manner to combat the wild plants and further increase the growth of the crop plants. A corresponding device is known, for example, from DE 44 13 739 A1.

Furthermore, a method is known from document US 2015/0245565 A1, in which plant rows are detected in order to improve the identification of noxious growth. The document thus proposes a way to control noxious growth.

However, due to various circumstances, the crops growing on the agricultural land may not be locally positioned along the intended row pattern. This may be due to inaccurate seeding, for example. Furthermore, in the area of the headland, there are regularly areas in which field-internal row structures are interrupted.

The problem underlying the invention is thus to enable a plant row-related spreading of granular material, in which the spreading in the area of row interruptions can be adapted locally in a suitable manner.

The problem is solved by a method of the kind mentioned introductorily, wherein the granular material is spread in row areas of the agricultural land having plant rows by at least one distribution element with a first distribution pattern and is spread in areas of the agricultural land not having plant rows by at least one distribution element with a second distribution pattern.

The invention takes advantage of the finding that by combining plant row detection on the one hand and the ability to spread granular material both row-wise and area-wise on the other hand, a suitable spreading adjustment can be implemented in areas where the row structure on the agricultural land is interrupted. The method thus allows granular material to be spread row-wise in row areas with rows of plants and, at the same time, spread evenly in areas without rows, in which there are no rows of plants in the direction of travel of the agricultural distribution device. This leads to a considerable saving of granular material. When spreading granular material on beets and corn, considerable amounts of nutrients can thus be saved. Significant amounts of fertilizer can also be saved when spreading granular material on potatoes.

Plant rows in the sense of the invention are rows of plants which run essentially parallel to the direction of travel of the agricultural distribution device. It should furthermore be taken into account that the first distribution pattern is different from the second distribution pattern. Preferably, the granular material is granular or powdered fertilizer. Preferably, all distribution elements of the agricultural distribution device are individually controllable. Preferably, the agricultural distribution device is a pneumatic fertilizer spreader. The distribution elements of the agricultural distribution device are preferably configured as distribution nozzles, baffle plates and/or guide devices.

In a preferred embodiment of the method according to the invention, the spreading of granular material in the row areas is carried out with a first group of distribution elements and the spreading of granular material in the non-row areas is carried out with a second group of distribution elements. Preferably, the distribution elements of the first group differ from the distribution elements of the second group. Alternatively, the distribution elements of the first group and the distribution elements of the second group may be substantially identical, wherein the distribution elements of the first group have a configuration that differs from the configuration of the distribution elements of the second group. Preferably, the distribution elements of the first group are equidistantly spaced apart to each other. It is further preferred that the distribution elements of the second group are equidistantly spaced apart to each other.

In another embodiment of the method according to the invention, the distribution pattern is automatically changed in a spreading area below the distribution linkage when the beginning of a plant row is detected. Alternatively or additionally, the distribution pattern is automatically changed in a spreading area below the distribution linkage when the end of a plant row is detected. In the area of the beginning of a plant row, a row-free area in the direction of travel of the distribution device merges into a row area. In the area of a plant row end, a row area in the direction of travel of the distribution device changes into a row-free area. When a plant row beginning is detected, an automatic adjustment of the first distribution pattern or an automatic changeover from the second distribution pattern to the first distribution pattern preferably takes place in the corresponding spreading area below the distribution linkage. When a plant row end is detected, an automatic adjustment of the second distribution pattern or an automatic changeover from the first distribution pattern to the second distribution pattern preferably takes place in the corresponding spreading area below the distribution linkage. A plant row can end, for example, in wedge areas of an agricultural land, at the headland of an agricultural land or due to inaccurate seeding. Furthermore, a corresponding plant row beginning results in these areas when driving in the opposite direction of travel In addition, a method according to the invention is preferred, in which the changing of the distribution pattern in a spreading area below the distribution linkage upon detection of a plant row beginning comprises the deactivation of at least one distribution element of the second group of distribution elements assigned to the spreading area and/or the activation of at least one distribution element of the first group of distribution elements assigned to the spreading area. One or more distribution elements are assigned to individual spreading areas below the distribution linkage and can be activated or deactivated depending on the row detection. Deactivating a distribution element interrupts its material spreading. Activating a distribution element initiates its material output. When a plant row beginning is detected, the spreading area must be switched from an area-related spreading of the granular material to a row-related spreading of the granular material. The switching is performed by deactivating at least one distribution element of the second group and activating at least one distribution element of the first group of distribution elements. In this context, activating/deactivating distribution elements may imply switching between a distribution element of the first group and a distribution element of the second group by means of a control device and/or adapting a distribution element of the first or second group such that its distribution pattern corresponds to the one distribution element of the second or first group. In order to adapt the distribution pattern of a guide element, an actuator system can be provided by means of which, for example, the shape of a distribution element designed as a baffle plate can be influenced: for spreading in a first distribution pattern, the baffle plate can assume a V-shaped form, wherein its spreading width is then small, whereas for spreading in a second distribution pattern, the baffle plate can be converted into a plate shape, wherein its spreading width is then widely diversified.

Furthermore, a method according to the invention is preferable, in which the changing of the distribution pattern in a spreading area below the distribution linkage upon detection of a plant row end comprises the deactivation of at least one distribution element of the first group of distribution elements associated with the spreading area and/or the activation of at least one distribution element of the second group of distribution elements associated with the spreading area. When the plant row end is detected, the spreading area must be switched from a row-related spreading of the granular material to an area-related spreading of the granular material. The switching is performed by deactivating at least one distribution element of the first group and activating at least one distribution element of the second group of distribution elements.

Furthermore, a method according to the invention is preferable, in which the changing of the distribution pattern in a spreading area below the distribution linkage upon detection of a plant row beginning and/or a plant row end comprises the changing of the distribution pattern of at least one distribution element associated with the spreading area. In particular, the distribution elements are configured as distribution nozzles, baffle plates, guiding devices, deflectors and/or the like, the distribution pattern of which is adjustable. When a plant row beginning and/or a plant row end is detected, a corresponding distribution pattern adjustment can be initiated automatically by the agricultural distribution device. If a plant row beginning is detected, an automatic adjustment of the first distribution pattern or an automatic changeover from the second distribution pattern to the first distribution pattern preferably takes place at the at least one distribution element associated with the spreading area. When a plant row end is detected, an automatic adjustment of the second distribution pattern or an automatic changeover from the first distribution pattern to the second distribution pattern preferably takes place at the at least one distribution element assigned to the spreading area.

In another embodiment of the method according to the invention, the first distribution pattern and the second distribution pattern differ in terms of their spreading widths and/or spreading angles. Accordingly, a low spreading angle in the row areas is preferred for a row-related narrow strip spreading. In the row areas, the spreading angle may be in a range of 30-40 degrees. The spreading width can be in a range of 10-20 cm. Preferably, there is no spreading of granular material between the row areas due to the adjusted distribution patterns. Furthermore, the method may also include detecting wildlife growth or noxious growth between detected row areas, in which case local recess spreading may be applied to the detected wildlife growth or noxious growth between the row areas. An areal spreading is preferably carried out with an open spreading angle in the row-free areas. In the row-free areas, the spreading is preferably carried out with a spreading angle of approximately 120 degrees. The spreading width in the row-free areas can be approximately 100 cm.

Moreover, the method is advantageously further embodied in that the first distribution pattern and the second distribution pattern result in different spreading quantities and/or different spreading rates of granular material. Due to different spreading quantities and/or spreading rates, different quantities of active agent can be spread in the row areas and row-free areas. Since the plant growth in the row areas corresponds to the expected plant growth, a comparatively precise adjustment of a suitable spreading quantity and/or spreading rate can be made in the row areas. In the row-free areas, the vegetation deviates from the expected vegetation so that in these areas, a corresponding factor must be taken into account when determining a suitable spreading quantity and/or spreading rate.

In addition, a method according to the invention is preferred in which different active agents and/or different active agent concentrations are spread when granular material is spread with the first distribution pattern and when granular material is spread with the second distribution pattern. The active agents may be, for example, plant fertilizers, soil fertilizers, fine seeders and/or pesticides. The active agent concentration may be higher in the row areas than in the row-free areas, especially in the case of plant fertilizers. Alternatively, the active agent concentration may be higher in the row-free areas than in the row areas, especially for soil fertilizers and/or pest control agents, such as slug pellets.

In an alternative embodiment of the method according to the invention, the detection of the plant rows on the agricultural land is carried out by means of one or more sensor devices and/or one or more cameras of the agricultural distribution device. Preferably, the one or more sensor devices and/or the one or more cameras of the agricultural distribution device are arranged on the distribution linkage of the agricultural distribution device and are preferably fixed. In particular, a sensor device and/or a camera for detecting plant rows is associated with individual or all distribution elements. In particular, the control of the distribution elements takes place depending on the data generated by the one or more sensor devices and/or the one or more cameras.

The problem underlying the invention is furthermore solved by an agricultural distribution device of the kind mentioned introductorily, wherein the control device of the agricultural distribution device according to the invention is adapted to initiate at least one distribution element to distribute the granular material with a first distribution pattern in row areas of the agricultural land having plant rows and to initiate at least one distribution element to distribute the granular material with a second distribution pattern in row-free areas of the agricultural land not having plant rows.

In this context, the detection device may comprise one or more cameras and/or sensors for plant row detection.

In a particularly preferred embodiment of the agricultural distribution device according to the invention, the same is adapted to carry out the method for spreading granular material according to one of the embodiments described above. With regard to the advantages and modifications of the agricultural distribution device, reference is made to the advantages and modifications of the method for spreading granular material according to the invention.

Figure 2:
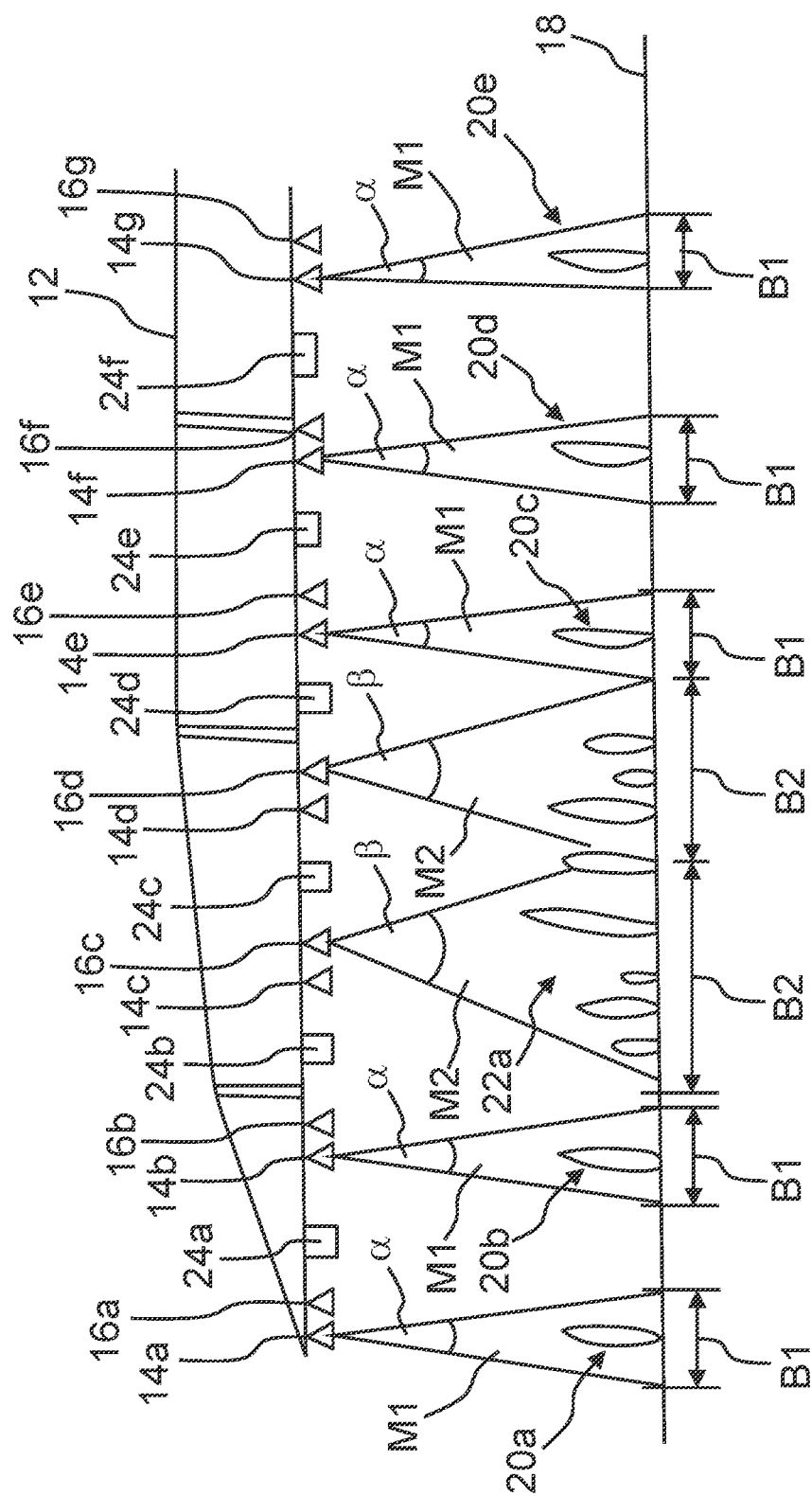

In the following, preferred embodiments of the invention are explained and described in more detail with reference to the accompanying drawings. Therein:

FIG. 1 shows an embodiment of the agricultural distribution device according to the invention during execution of the method according to the invention in a schematic view; and FIG. 2 shows a distribution linkage of an agricultural distribution device according to the invention during execution of the method according to the invention in a schematic view.

FIG. 1 shows an agricultural distribution device 10 configured as a pneumatic fertilizer spreader, which is pulled by a tractor 100. The agricultural distribution device 10 spreads granular material onto an agricultural land 18 and crops located on the agricultural land 18. The agricultural distribution device 10 moves along tramlines that are part of a tramline system created within the agricultural land 18.

During the spreading of granular material onto the agricultural land 18, the agricultural distribution device 10 detects plant rows on the agricultural land 18 that run substantially parallel to the direction of travel of the agricultural distribution device 10.

On the agricultural land 18, there are row areas 20*a*-20*p* in which plant rows run substantially parallel to the direction of travel of the agricultural distribution device 10. In addition, there are row-free areas 22*a*-22*d* on the agricultural land 18 which do not have plant rows running parallel to the direction of travel of the agricultural distribution device 10. The row-free areas 22*a*-22*c* are due to inaccurate seed placement. The row-free area 22*d* is located in the area of the headland, wherein the seed spreading in this area took place parallel to the headland driving lane so that the field-internal row structure is interrupted in a transition area to the headland.

The agricultural distribution device 10 has a plurality of distribution elements 14*a*-14*g*, 16*a*-16*g* arranged on a distribution linkage 12, which are configured as distribution nozzles. The granular material is spread via the distribution elements 14*a*-14*g*, 16*a*-16*g* onto the agricultural land 18 and the plants located thereon. In the row areas 20*a*-20*p* of the agricultural land 18, the granular material is spread with a first distribution pattern M1. In the row-free areas 22*a*-22*d* of the agricultural land 18, the granular material is spread with a second distribution pattern M2. The first distribution pattern M1 and the second distribution pattern M2 initially differ in terms of their spreading widths B1, B2 and their spreading angles α, β. The granular material is spread in the row areas 20*a*-20*p* with the distribution pattern M1 in a row-related manner, resulting in a narrow strip spread along the respective plant rows. Accordingly, the distribution pattern M1 has a small spreading angle α. In the row-free areas 22*a*-22*d*, the distribution pattern M2 is used to spread the granular material over a wide area in a non-row-related manner. Accordingly, the distribution pattern M2 has a comparatively open spreading angle β.

Furthermore, the first distribution pattern M1 and the second distribution pattern M2 can result in different spreading quantities of granular material. Since in the row areas 20*a*-20*p* a targeted spreading can be carried out on the plants arranged in rows, the spreading quantity in the row areas 20*a*-20*p* can be lower than the spreading quantity in the row-free areas 22*a*-22*d*, on which the granular material is spread with the second distribution pattern M2.

In addition, during spreading of granular material with the first distribution pattern M1 and during spreading of granular material with the second distribution pattern M2, different active agents and/or different active agent concentrations can be spread.

If the agricultural distribution device 10 detects a plant row beginning during spreading of the granular material, the distribution pattern in the corresponding spreading area below the distribution linkage 12 is automatically changed by the agricultural distribution device 10. In the area of a plant row beginning, a row-free area 22*a*-22*d* in the direction of travel of the distribution device 10 changes into a row area 20*a*-20*p*. When a plant row beginning is detected, an automatic adjustment of the first distribution pattern M1 takes place in the corresponding spreading area below the distribution linkage 12.

When a plant row end is detected in a spreading area below the distribution linkage 12, the distribution pattern in the corresponding spreading area below the distribution linkage 12 is automatically changed by the agricultural distribution device 10. In the area of a plant row end, a row area 20*a*-20*p* in the direction of travel of the distribution device 10 changes to a row-free area 22*a*-22*d*. When a plant row end is detected, an automatic adjustment of the second distribution pattern M2 takes place in the corresponding spreading area below the distribution linkage 12.

FIG. 2 shows a distribution linkage 12 with a plurality of distribution elements 14*a*-14*g*, 16*a*-16*g* configured as distribution nozzles. The distribution elements 14*a*-14*g*, 16*a*-16*g* comprise a first group of distribution elements 14*a*-14*g* and a second group of distribution elements 16*a*-16*g*. A first distribution pattern M1 can be realized with the distribution elements 14*a*-14*g*. A second distribution pattern M2 can be realized with the distribution elements 16*a*-16*g*. The first distribution pattern M1 and the second distribution pattern M2 differ with respect to their spreading widths B1, B2 and their spreading angles α, B. In the present case, the distribution elements 14*a*-14*g*, 16*a*-16*g* are arranged in pairs, although different arrangements are possible in other embodiments.

Furthermore, a plurality of cameras 24*a*-24*f* are arranged on the distribution linkage 12, which are components of a detection device. The detection device is used to detect plant rows on the agricultural land 18 during the spreading of the granular material. By means of a control device of the agricultural distribution device 10, the distribution elements 14*a*-14*g*, 16*a*-16*g* can be controlled individually.

In the row areas 20*a*-20*e* detected by the cameras 24*a*-24*f*, the granular material is spread by means of the distribution elements 14*a*, 14*b*, 14*e*, 14*f*, 14*g* of the first group of distribution elements 14*a*-14*g*. In the row-free area 22*a* detected by the cameras 24*a*-24*f*, the granular material is spread by means of the distribution elements 16*c*, 16*d* from the second group of distribution elements 16*a*-16*g*. Thus, in the row areas 20*a*-20*e*, a row-related spreading of the granular material with the first distribution pattern M1 occurs. In the row-free area 22*a*, an areal spreading of the granular material with the distribution pattern M2 occurs.

If, in the further course, a new plant row beginning is detected, an automatic changeover from the second distribution pattern M2 to the first distribution pattern M1 takes place in the corresponding spreading area below the distribution linkage 12. The changeover from the second distribution pattern M2 to the first distribution pattern M1 is implemented by deactivating at least one distribution element 16*a*-16*g* of the second group of distribution elements 16*a*-16*g* associated with the spreading area and activating at least one distribution element 14a-14g of the first group of distribution elements 14a-14g associated with the spreading area.

If, in the further course, a plant row end is detected, an automatic changeover from the first distribution pattern M1 to the second distribution pattern M2 takes place in the corresponding spreading area below the distribution linkage 12. The changeover from the first distribution pattern M1 to the second distribution pattern M2 is implemented by deactivating at least one distribution element 14a-14g of the first group of distribution elements 14a-14g associated with the spreading area and activating at least one distribution element 16a-16g of the second group of distribution elements 16a-16g associated with the spreading area.

REFERENCE SIGNS 10 agricultural distribution device
12 distribution linkage
16a-16g distribution elements
18 agricultural land
20a-20p row areas
22a-22d row-free areas
24a-24f cameras
100 tractor
M1, M2 distribution pattern
B1, B2 spreading width
α, β spreading angle

The invention claimed is:

1. A method of spreading granular material by an agricultural distribution device, comprising the steps of:
  spreading the granular material onto an agricultural land by a plurality of distribution elements arranged on a distribution linkage of the agricultural distribution device, and
  detecting plant rows on the agricultural land during the spreading of the granular material,
  wherein the granular material is spread in row areas having agricultural crops, the row areas of the agricultural land having plant rows, the granular material being spread in the row areas having agricultural crops by at least one distribution element with a first distribution pattern, and
  wherein the granular material is spread in row-free areas having agricultural crops, the row-free areas of the agricultural land having no plant rows, the granular material being spread in the row-free areas having agricultural crops by at least one distribution element with a second distribution pattern.

2. Method according to claim 1, wherein the spreading of the granular material in the row areas is carried out with a first group of distribution elements and the spreading of the granular material in the row-free areas is carried out with a second group of distribution elements.

3. The method according to claim 1, further comprising at least one of the following steps:
  automatically changing from the second distribution pattern to the first distribution pattern in a spreading area below the distribution linkage when a plant row beginning is detected; or
  automatically changing from the first distribution pattern to the second distribution pattern in a spreading area below the distribution linkage when a plant row end is detected.

4. The method according to claim 3, wherein changing from the second distribution pattern to the first distribution pattern in the spreading area below the distribution linkage upon detection of the plant row beginning comprises at least one of the following steps:
  deactivating the at least one distribution element of the second group of distribution elements associated with the spreading area; or
  activating the at least one distribution element of the first group of distribution elements associated with the spreading area.

5. The method according to claim 3, wherein changing from the first distribution pattern to the second distribution pattern in the spreading area below the distribution linkage upon detection of the plant row end comprises at least one of the following steps:
  deactivating the at least one distribution element of the first group of distribution elements associated with the spreading area; or
  activating the at least one distribution element of the second group of distribution elements associated with the spreading area.

6. The method according to claim 3, wherein changing from the second distribution pattern to the first distribution pattern in the spreading area below the distribution linkage upon detecting the plant row beginning comprises the following step:
  changing from the second distribution pattern to the first distribution pattern of the at least one distribution element associated with the spreading area.

7. The method according to claim 3, wherein changing from the first distribution pattern to the second distribution pattern in the spreading area below the distribution linkage upon detecting the plant row end comprises the following step:
  changing from the first distribution pattern to the second distribution pattern of the at least one distribution element associated with the spreading area.

8. The method according to claim 1, wherein the first distribution pattern and the second distribution pattern differ with respect to at least one of spreading widths or spreading angles.

9. The method according to claim 1, wherein the first distribution pattern and the second distribution pattern result in different spreading quantities or different spreading rates of the granular material.

10. The method according to claim 1, wherein different active agents or different active agent concentrations are spread during the spreading of the granular material with the first distribution pattern and during the spreading of the granular material with the second distribution pattern.

11. The method according to claim 1, wherein the detection of the plant rows on the agricultural land is carried out by means of one or more sensor devices or one or more cameras of the agricultural distribution device.

* * * * *